US008469440B2

(12) United States Patent
Thorpe et al.

(10) Patent No.: US 8,469,440 B2
(45) Date of Patent: Jun. 25, 2013

(54) CLOSURE ASSEMBLY HAVING CONTINUALLY ADJUSTABLE LATERAL RESTRAINT

(75) Inventors: Scott W. Thorpe, Milford, MI (US); Matthew J. Nelson, Washington, MI (US); David P. Zink, Shelby Township, MI (US); Altaf S. Imam, Troy, MI (US); Shawn G. Quinn, Grand Blanc, MI (US); Michael E. McGuire, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 151 days.

(21) Appl. No.: 13/197,835

(22) Filed: Aug. 4, 2011

(65) Prior Publication Data

US 2013/0031843 A1 Feb. 7, 2013

(51) Int. Cl.
*B60J 5/00* (2006.01)
*E05B 65/12* (2006.01)

(52) U.S. Cl.
USPC ................ 296/146.9; 296/146.1; 292/341.15; 292/DIG. 3; 292/DIG. 55

(58) Field of Classification Search
USPC .......... 296/146.1, 146.5, 146.6, 146.8, 146.9, 296/155; 292/145, 216, 341.15, 341.17, 342, 292/DIG. 3, DIG. 55; 49/503
See application file for complete search history.

(56) References Cited

U.S. PATENT DOCUMENTS

| | | | | |
|---|---|---|---|---|
| 5,411,302 | A * | 5/1995 | Shimada | 292/201 |
| 2006/0055179 | A1 * | 3/2006 | Burton | 292/216 |
| 2010/0259067 | A1 * | 10/2010 | Bell et al. | 296/146.11 |

* cited by examiner

*Primary Examiner* — Glenn Dayoan
*Assistant Examiner* — Jason S Daniels
(74) *Attorney, Agent, or Firm* — Quinn Law Group, PLLC

(57) ABSTRACT

A closure assembly includes a striker assembly and a latch mechanism. The striker assembly includes a first wedge block and a second wedge block disposed opposite each other across a path. The first wedge block rotates about a first axis and includes a first cam surface defining a continuously variable distance to the first axis for engaging the latch mechanism. The second wedge block rotates about a second axis and includes a second cam surface defining a continuously variable distance from to the second axis for engaging the latch mechanism. Abutting engagement between the latch mechanism and the first cam surface limits lateral movement of the latch mechanism relative to the path in a first direction, and abutting engagement between the latch mechanism and the second cam surface limits lateral movement of the latch mechanism relative to the path in a second direction, which is opposite the first direction.

20 Claims, 3 Drawing Sheets

CLOSURE ASSEMBLY HAVING CONTINUALLY ADJUSTABLE LATERAL RESTRAINT

TECHNICAL FIELD

The invention generally relates to a closure assembly for securing a moveable panel, such as a lift gate, a decklid, or a hatch, to a body of a vehicle.

BACKGROUND

Vehicles include moveable panels for sealing openings in a body of the vehicle. The moveable panels may but are not limited to a lift gate for sealing a rear opening of a Sport Utility Vehicle (SUV), a decklid for sealing a trunk space of a sedan, or a hatch for sealing a rear opening of a hatchback. It should be appreciated that the opening and the moveable panel may be located anywhere on the vehicle, and may be positioned in any suitable orientation.

A closure assembly secures the moveable panel relative to the body of the vehicle. The closure assembly includes a striker assembly and a latch mechanism. Typically, the striker assembly is attached to the body, and a latch mechanism is attached to and moveable with the panel. However, the relative positions of the striker assembly and the latch mechanism may be reversed. The striker assembly includes a wire striker, which generally forms a loop. The panel and the latch mechanism move along a path into and out of engagement with the striker assembly. The latch mechanism engages the wire striker of the striker assembly in interlocking engagement to secure the panel relative to the body. The interlocking engagement between the striker assembly and the latch mechanism must minimize and/or eliminate movement of the panel in a lateral direction relative to the path to prevent undesirable noise, paint chips, etc.

SUMMARY

A closure assembly for securing a moveable panel relative to a body of a vehicle is provided. The closure assembly includes a striker assembly having a base and a wire striker fixedly attached to the base. A latch mechanism is moveable along a path relative to the striker assembly. The latch mechanism includes a closed position and an open position. When in the closed position, the latch mechanism is configured for engaging the wire striker in interlocking engagement to secure the latch mechanism relative to the striker assembly. When in the open position, the latch mechanism is configured for not engaging the wire striker in interlocking engagement to allow movement along the path of the latch mechanism relative to the striker assembly. The striker assembly includes a first wedge block that is supported by and rotatably attached to the base. The first wedge block rotates about a first axis. The first wedge block includes a first cam surface that defines a variable distance between the first cam surface and the first axis. The first cam surface continuously engages the latch mechanism as the latch mechanism moves along the path to limit lateral movement of the latch mechanism in a first direction relative to the path.

A vehicle is also provided. The vehicle includes a body defining an opening, and a panel moveably attached to the body for selectively sealing the opening. A closure assembly interconnects the body and the panel for selectively securing the panel relative to the body in a closed position. The closure assembly includes a striker assembly and a latch mechanism. The striker assembly includes a base attached to the body, and a wire striker fixedly attached to the base. The latch mechanism is attached to the panel, and is moveable along a path relative to the striker assembly. The latch mechanism includes a closed position and an open position. When in the closed position, the latch mechanism is configured for engaging the wire striker in interlocking engagement to secure the latch mechanism relative to the striker assembly. When in the open position, the latch mechanism is configured for not engaging the wire striker in interlocking engagement to allow movement along the path of the latch mechanism relative to the striker assembly. The striker assembly includes a first wedge block and a second wedge block. The first wedge block is supported by and rotatably attached to the base for rotation about a first axis. The second wedge block is supported by and rotatably attached to the base for rotation about a second axis. The second wedge block is disposed opposite the first wedge block across the path. The first wedge block includes a first cam surface that defines a variable distance between the first cam surface and the first axis. The first cam surface continuously engages the latch mechanism as the latch mechanism moves along the path to limit lateral movement of the latch mechanism in a first direction relative to the path. The second wedge block includes a second cam surface that defines a variable distance between the second cam surface and the second axis. The second cam surface continuously engages the latch mechanism as the latch mechanism moves along the path to limit lateral movement of the latch mechanism in a second direction relative to the path. The second direction is opposite the first direction.

Accordingly, the first wedge block and the second wedge block limit lateral movement of the latch mechanism, thereby limiting lateral movement of the panel. Because the first wedge block and the second wedge block are rotatable independent of each other, the first cam surface and the second cam surface may each independently engage the latch mechanism to prevent lateral movement thereof even when the latch mechanism is centered on, i.e., aligned along, the path of the latch mechanism.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as “above,” “below,” “upward,” “downward,” “top,” “bottom,” etc., are used descriptively for the figures, and do not represent limitations on the scope of the invention, as defined by the appended claims.

Figure 1:
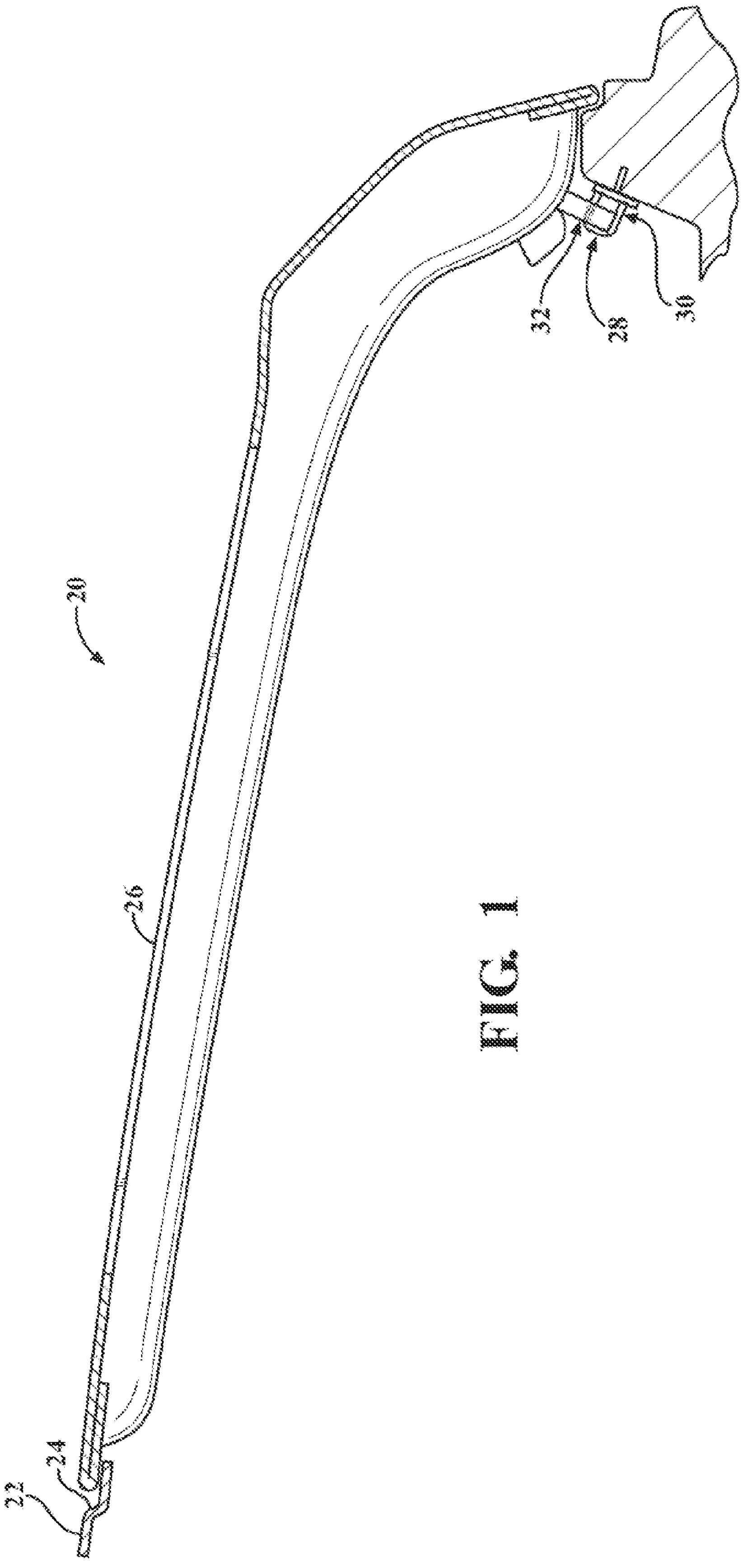
FIG. 1 is a schematic cross sectional view of a vehicle.

Referring to the Figures, wherein like numerals indicate like parts throughout the several views, a vehicle is generally shown at 20. Referring to FIG. 1, the vehicle 20 includes a body 22 that defines an opening 24. The opening 24 may include, for example, a rear access to a cargo van or a sport utility vehicle 20, or a trunk to a sedan. It should be appreciated that the opening 24 may be located and oriented in any position on the body 22 of the vehicle 20. A panel 26 is moveably attached to the body 22, for example, by one or more hinges. The panel 26 moves between a first position to allow access to the opening 24, and a second position to selectively seal the opening 24. The panel 26 may include, for example, a deck lid, a lift gate, a hatch back, a door, or some other closure panel 26.

Figure 2:
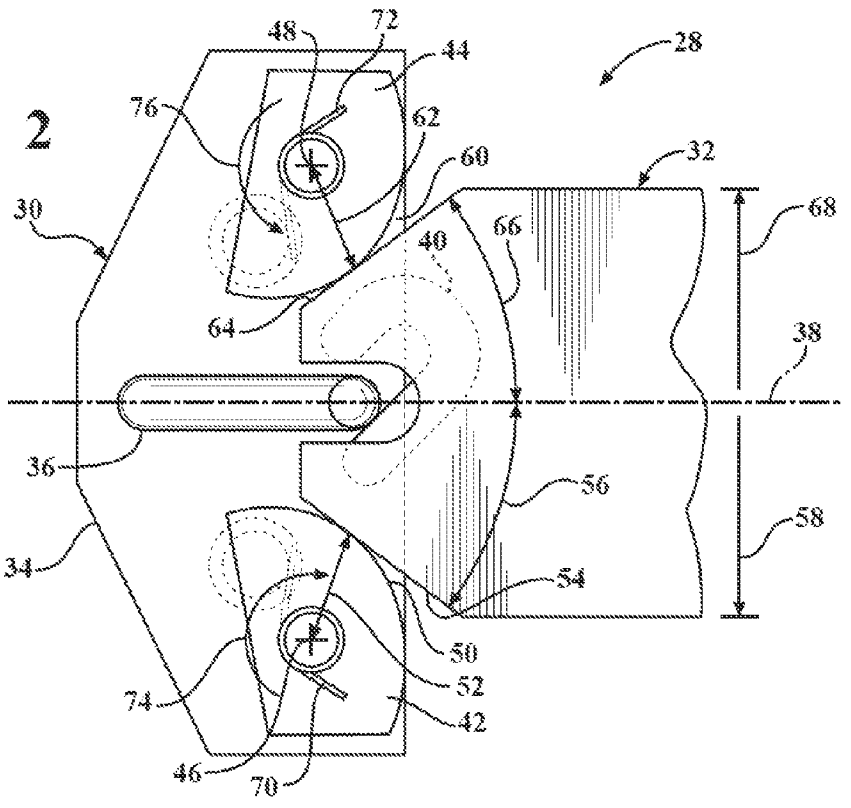
FIG. 2 is a schematic plan view of a closure assembly for the vehicle in an open position.
Figure 3:
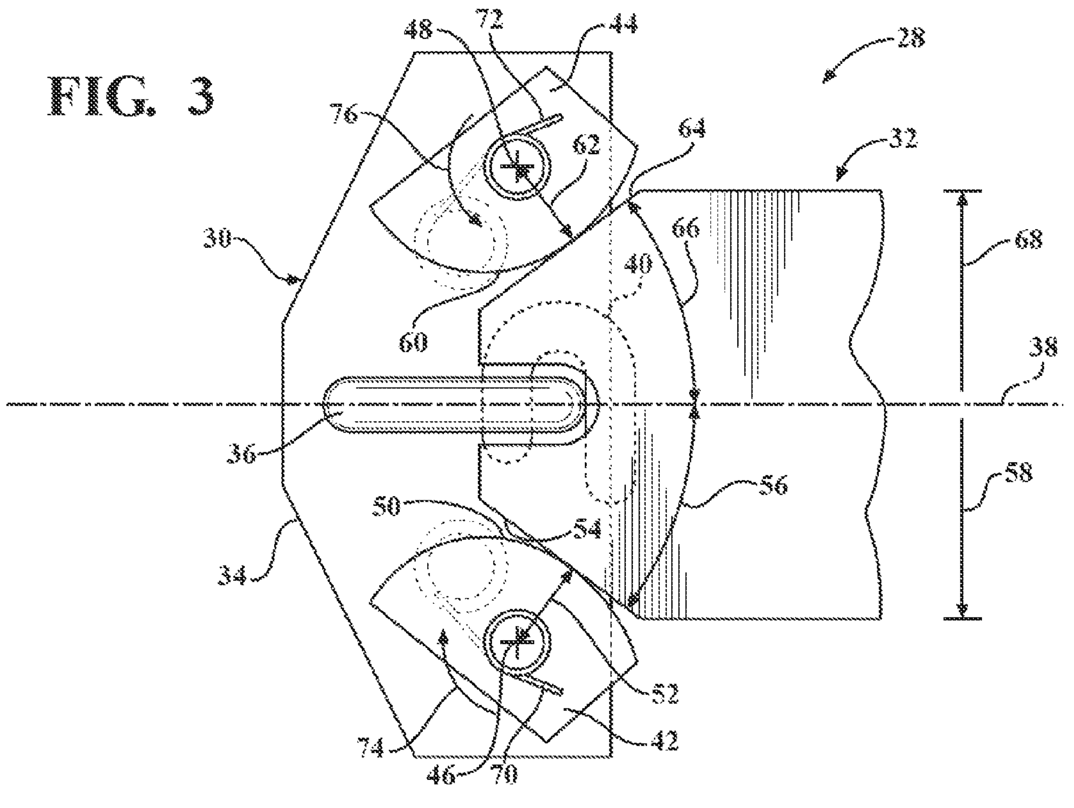
FIG. 3 is a schematic plan view of the closure assembly in a closed position.

A closure assembly 28 secures the panel 26 relative to the body 22 in the second position, i.e., the sealed position. The closure assembly 28 includes a striker assembly 30 and a latch mechanism 32. Referring to FIGS. 2 and 3, the striker assembly 30 includes a base 34 supporting a wire striker 36, with the wire striker 36 fixedly attached to the base 34. Preferably, the striker assembly 30 is attached to the body 22, and the latch mechanism 32 is attached to the panel 26. However, it should be appreciated that the relative positions of the striker assembly 30 and the latch mechanism 32 may be reversed, with the latch mechanism 32 attached to the body, and the striker assembly attached to and moveable with the panel 26. The wire striker 36 may define a loop as is known. As shown, the latch mechanism 32 moves with the panel 26 along a path 38 relative to the striker assembly 30, and includes an open position, shown in FIG. 2, and a closed position, shown in FIG. 3. When in the closed position, the latch mechanism 32 engages the wire striker 36 in interlocking engagement to secure the latch mechanism 32 relative to the striker assembly 30. For example, a lock bolt 40 may rotate around or otherwise grasp the wire striker 36. When the latch mechanism 32 is in the open position, the latch mechanism 32 does not engage the wire striker 36 in interlocking engagement, i.e., the latch mechanism 32 is disengaged from the interlocking engagement with the wire striker 36, to allow movement of the latch mechanism 32 and the panel 26 relative to the striker assembly 30. The latch mechanism 32 and wire striker 36 may include any suitable combination, and/or configuration known to those skilled in the art and/or capable of securely latching the panel 26 to the body 22. Accordingly, the specifics of the wire striker 36, the latch mechanism 32, and the operation of the interlocking engagement therebetween are not described in detail herein.

The striker assembly 30 includes a first wedge block 42 and a second wedge block 44. The first wedge block 42 is supported by and rotatably attached to the base 34. The first wedge block 42 is rotatable about a first axis 46. The first axis 46 is laterally spaced from the path 38 of the latch mechanism 32, and is disposed on a first, i.e., a lower side, of the path 38. The second wedge block 44 is also supported by and rotatably attached to the base 34. The second wedge block 44 is rotatable about a second axis 48. The first wedge block 42 is rotatable relative to the base 34 independently of the second wedge block 44. Similarly, the second wedge block 44 is rotatable relative to the base 34 independently of the first wedge block 42.

The second axis 48 is laterally spaced from the path 38 of the latch mechanism 32, and is disposed on a second, i.e., an upper side, of the path 38. The second wedge block 44 is disposed opposite the first wedge block 42 across the path 38. Preferably, the first axis 46 and the second axis 48 are disposed equidistant from the path 38 on opposite sides of the path 38, i.e., the first axis 46 is disposed on one side of the path 38 a pre-defined distance from the path 38, and the second axis 48 is disposed on another side of the path 38, the same pre-defined distance from the path 38.

The first wedge block 42 includes a first cam surface 50. The first cam surface 50 extends along a continuously curved edge surface of the first wedge block 42 to define a curved surface relative to the first axis 46. Accordingly, the first cam surface 50 defines a first variable distance 52 between the first cam surface 50 and the first axis 46.

The latch mechanism 32 includes a first engaging surface 54 configured for engaging the first cam surface 50. The first engaging surface 54 may be defined, for example, by a casing or housing of the latch mechanism 32. The first engaging surface 54 extends along a linear edge surface of the latch mechanism 32 to define a planar surface, i.e., a surface disposed on a plane. The first engaging surface 54 is angled relative to the path 38 of the latch mechanism 32 to define a first acute angle 56.

The first cam surface 50 continuously engages the latch mechanism 32 as the latch mechanism 32 moves along the path 38. More specifically, the first cam surface 50 engages the first engaging surface 54 of the latch mechanism 32. It should be appreciated that the area of contact between the first engaging surface 54 and the first cam surface 50 moves relative to the first cam surface 50 and the first engaging surface 54 as the latch mechanism 32 moves along the path 38. The first cam surface 50 of the first wedge block 42 engages the latch mechanism 32 to limit lateral movement of the latch mechanism 32 in a first direction 58 relative to the path 38.

The second wedge block 44 includes a second cam surface 60. The second cam surface 60 extends along a continuously curved edge surface of the second wedge block 44 to define a curved surface relative to the second axis 48. Accordingly, the second cam surface 60 defines a second variable distance 62 between the second cam surface 60 and the second axis 48.

The latch mechanism 32 includes a second engaging surface 64 configured for engaging the second cam surface 60. The second engaging surface 64 may be defined, for example, by the casing or housing of the latch mechanism 32. The second engaging surface 64 extends along a linear edge surface of the latch mechanism 32 to define a planar surface, i.e., a surface disposed on a plane. The second engaging surface 64 is angled relative to the path 38 of the latch mechanism 32 to define a second acute angle 66.

The second cam surface 60 continuously engages the latch mechanism 32 as the latch mechanism 32 moves along the path 38. More specifically, the second cam surface 60 engages the second engaging surface 64 of the latch mechanism 32. It should be appreciated that the area of contact between the second engaging surface 64 and the second cam surface 60 moves relative to the second cam surface 60 and the second engaging surface 64 as the latch mechanism 32 moves along the path 38. The second cam surface 60 of the second wedge block 44 engages the latch mechanism 32 to limit lateral movement of the latch mechanism 32 in a second direction 68 relative to the path 38. The second direction 68 is opposite the first direction 58.

As the latch mechanism 32 moves along the path 38 toward the striker assembly 30, the latch mechanism 32 comes into abutting engagement with the first wedge block 42 and/or the second wedge block 44, such as shown in FIG. 2. More specifically, the first engaging surface 54 of the latch mechanism 32 comes into abutting engagement with the first cam surface 50 of the first wedge block 42, and/or the second engaging surface 64 of the latch mechanism 32 comes into abutting engagement with the second cam surface 60 of the second wedge block 44. As the latch mechanism 32 continues along the path 38 toward the striker assembly 30, such as shown in FIG. 3, frictional engagement between the first engaging surface 54 and the first cam surface 50 rotates the first wedge block 42. As the first wedge block 42 rotates, the continuously changing first variable distance 52 between the first cam surface 50 and the first axis 46 interacts with the first engaging surface 54 disposed at the first acute angle 56 relative to the path 38 to maintain abutted engagement between the first engaging surface 54 and the first cam surface 50. Similarly, frictional engagement between the second engaging surface 64 and the second cam surface 60 rotates the second wedge block 44. As the second wedge block 44 rotates, the continuously changing second variable distance 62 between the second cam surface 60 and the second axis 48 interacts with the second engaging surface 64 disposed at the second acute angle relative to the path 38 to maintain abutted engagement between the second engaging surface 64 and the second cam surface 60. Accordingly, it should be appreciated that the shape and/or orientation of the first cam surface 50, which determines the rate of change of the first variable distance 52 between the first cam surface 50 and the first axis 46, and the first acute angle 56 between the first engaging surface 54 and the path 38, are designed to compliment each other. Similarly, the shape and/or orientation of the second cam surface 60, which determines the rate of change of the second variable distance 62 between the second cam surface 60 and the second axis 48, and the second acute angle 66 between the second engaging surface 64 and the path 38, are designed to compliment each other.

The striker assembly 30 may further include a first biasing device 70 and a second biasing device 72. The first biasing device 70 interconnects the first wedge block 42 and the base 34. The first biasing device 70 biases the first wedge block 42 in a first rotational direction 74 about the first axis 46 into a receiving position. The receiving position of the first wedge block 42, which is shown in FIG. 2, is the position of the first wedge block 42 when ready to initially engage the latch mechanism 32. The second biasing device 72 interconnects the second wedge block 44 and the base 34. The second biasing device 72 biases the second wedge block 44 in a second rotational direction 76 about the second axis 48 into a receiving position. The second rotational direction 76 is opposite the first rotational direction 74. The receiving position of the second wedge block 44, which is shown in FIG. 2, is the position of the second wedge block 44 when ready to initially engage the latch mechanism 32. The first biasing device 70 and the second biasing device 72 may each include any device capable of rotationally biasing the first wedge block 42 and the second wedge block 44 respectively. For example, the first biasing device 70 and the second biasing device 72 may each include but are not limited to a coil spring or other similar device.

Figure 4:
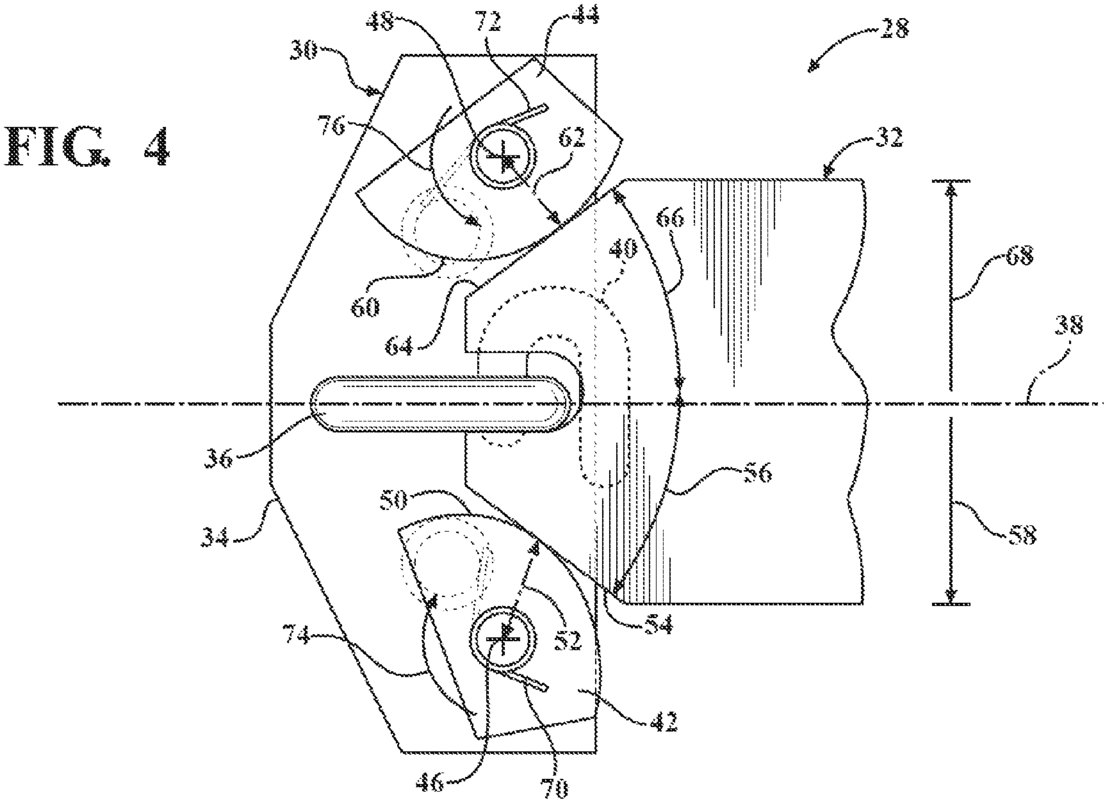
FIG. 4 is another schematic plan view of the closure assembly in the closed position, wherein a latch mechanism of the closure assembly is misaligned with a striker assembly of the closure assembly.

As shown in FIGS. 2 and 3, the latch mechanism 32 is aligned along the path 38 such that a longitudinal axis of the latch mechanism 32 is coaxially aligned with the path 38. However, it should be appreciated that the longitudinal axis of the latch mechanism 32 may be offset from the path 38, such as shown in FIG. 4. This may be referred to as the latch mechanism 32 being misaligned from the path 38. Referring to FIG. 4, when the latch mechanism 32 is misaligned from the path 38, the first wedge block 42 and the second wedge block 44 are still capable of independently engaging the latch mechanism 32, and limiting lateral movement of the latch mechanism 32 in both the first direction 58 and the second direction 68. It should be appreciated that the interaction between the first cam surface 50 and the first engaging surface 54, and the relative positions therebetween may differ from the interaction between the second cam surface 60 and the second engaging surface 64. For example, if the latch mechanism 32 is offset from the path 38 toward the first wedge block 42, then the first engaging surface 54 contacts the first cam surface 50 at a location nearer the first axis 46 than when the latch mechanism 32 is aligned along the path 38. Concurrently, the second engaging surface 64 contacts the second cam surface 60 at a location farther from the second axis 48 than when the latch mechanism 32 is aligned along the path 38. However, once contacted, the frictional engagement between the first cam surface 50 and the first engaging surface 54, and between the second cam surface 60 and the second engaging surface 64, causes both the first wedge block 42 and the second wedge block 44 to rotate and maintain the abutting engagement therebetween to limit the lateral movement of the latch mechanism 32.

While the best modes for carrying out the invention have been described in detail, those familiar with the art to which this invention relates will recognize various alternative designs and embodiments for practicing the invention within the scope of the appended claims.

The invention claimed is:

1. A closure assembly for securing a moveable panel relative to a body of a vehicle, the closure assembly comprising:
- a striker assembly having a base and a wire striker fixedly attached to the base; and
- a latch mechanism moveable along a path relative to the striker assembly and including a closed position configured for engaging the wire striker in interlocking engagement to secure the latch mechanism relative to the striker assembly, and an open position configured for not engaging the wire striker in interlocking engagement to allow movement along the path of the latch mechanism relative to the striker assembly;
- wherein the striker assembly includes a first wedge block supported by and rotatably attached to the base for rotation about a first axis,
- wherein the first wedge block includes a first cam surface defining a variable distance between the first cam surface and the first axis for continuously engaging the latch mechanism as the latch mechanism moves along the path to limit lateral movement of the latch mechanism in a first direction relative to the path.

2. A closure assembly as set forth in claim 1 wherein the first cam surface extends along a continuously curved edge surface of the first wedge block to define a curved surface.

3. A closure assembly as set forth in claim 1 wherein the latch mechanism includes a first engaging surface configured for engaging the first cam surface.

4. A closure assembly as set forth in claim 3 wherein the first engaging surface extends along a linear edge surface of the latch mechanism to define a planar surface.

5. A closure assembly as set forth in claim 3 wherein the first engaging surface is angled relative to the path of the latch mechanism to define an acute angle.

6. A closure assembly as set forth in claim 3 wherein frictional engagement between the first engaging surface and the first cam surface during movement of the latch mechanism along the path rotates the first wedge block to maintain abutted engagement between the first engaging surface and the first cam surface.

7. A closure assembly as set forth in claim 1 wherein the striker assembly includes a first biasing device interconnecting the first wedge block and the base, wherein the first biasing device is configured for biasing the first wedge block in a first rotational direction about the first axis into a receiving position.

8. A closure assembly as set forth in claim 1 wherein the striker assembly includes a second wedge block supported by and rotatably attached to the base for rotation about a second axis, wherein the second wedge block is disposed opposite the first wedge block across the path.

9. A closure assembly as set forth in claim 8 wherein the second wedge block includes a second cam surface defining a variable distance between the second cam surface and the second axis for continuously engaging the latch mechanism as the latch mechanism moves along the path to limit lateral movement of the latch mechanism in a second direction relative to the path.

10. A closure assembly as set forth in claim 9 wherein the second cam surface extends along a continuously curved edge surface of the second wedge block to define a curved surface.

11. A closure assembly as set forth in claim 8 wherein the latch mechanism includes a second engaging surface configured for engaging the second cam surface.

12. A closure assembly as set forth in claim 11 wherein the second engaging surface extends along a linear edge surface of the latch mechanism to define a planar surface.

13. A closure assembly as set forth in claim 11 wherein the second engaging surface is angled relative to the path of the latch mechanism to define an acute angle.

14. A closure assembly as set forth in claim 11 wherein frictional engagement between the second engaging surface and the second cam surface during movement of the latch mechanism along the path rotates the second wedge block to maintain abutted engagement between the second engaging surface and the second cam surface.

15. A closure assembly as set forth in claim 8 wherein the striker assembly includes a second biasing device interconnecting the second wedge block and the base, wherein the second biasing device is configured for biasing the second wedge block in a second rotational direction about the second axis into a receiving position.

16. A closure assembly as set forth in claim 8 wherein the first wedge block is rotatable relative to the base independently of the second wedge block.

17. A vehicle comprising:

a body defining an opening;

a panel moveably attached to the body for selectively sealing the opening;

a closure assembly interconnecting the body and the panel for selectively securing the panel relative to the body in a closed position, wherein the closure assembly includes:

a striker assembly having a base attached to the body, and a wire striker fixedly attached to the base; and a latch mechanism attached to the panel and moveable along a path relative to the striker assembly, and including a closed position configured for engaging the wire striker in interlocking engagement to secure the latch mechanism relative to the striker assembly, and an open position configured for not engaging the wire striker in interlocking engagement to allow movement along the path of the latch mechanism relative to the striker assembly;

wherein the striker assembly includes a first wedge block supported by and rotatably attached to the base for rotation about a first axis, wherein the striker assembly includes a second wedge block supported by and rotatably attached to the base for rotation about a second axis, with the second wedge block disposed opposite the first wedge block across the path;

wherein the first wedge block includes a first cam surface defining a variable distance between the first cam surface and the first axis for continuously engaging the latch mechanism as the latch mechanism moves along the path to limit lateral movement of the latch mechanism in a first direction relative to the path;

wherein the second wedge block includes a second cam surface defining a variable distance between the second cam surface and the second axis for continuously engaging the latch mechanism as the latch mechanism moves along the path to limit lateral movement of the latch mechanism in a second direction relative to the path; and wherein the first direction is opposite the second direction.

18. A vehicle as set forth in claim 17 wherein the latch mechanism includes a first engaging surface angled relative to the path of the latch mechanism to define an acute angle and configured for engaging the first cam surface, and further includes a second engaging surface angled relative to the path of the latch mechanism to define an acute angle and configured for engaging the second cam surface.

19. A vehicle as set forth in claim 18 wherein frictional engagement during movement of the latch mechanism along the path between the first engaging surface and the first cam surface and between the second engaging surface and the second cam surface rotates the first wedge block to maintain abutted engagement between the first engaging surface and the first cam surface and rotates the second wedge block to maintain abutted engagement between the second engaging surface and the second cam surface.

20. A vehicle as set forth in claim 19 wherein the striker assembly includes a first biasing device interconnecting the first wedge block and the base, and a second biasing device interconnecting the second wedge block and the base, wherein the first biasing device is configured for biasing the first wedge block in a first rotational direction about the first axis into a receiving position, and the second biasing device is configured for biasing the second wedge block in a second rotational direction about the second axis into a receiving position, wherein the first rotational direction is opposite the second rotational direction.

* * * * *